(12) United States Patent
Spicer et al.

(10) Patent No.: US 8,089,987 B2
(45) Date of Patent: Jan. 3, 2012

(54) SYNCHRONIZING IN-MEMORY CACHES WHILE BEING UPDATED BY A HIGH RATE DATA STREAM

(75) Inventors: Michael John Elvery Spicer, Lafayette, CA (US); Richard James Taylor, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 11/476,624

(22) Filed: Jun. 29, 2006

(65) Prior Publication Data
US 2008/0002743 A1   Jan. 3, 2008

(51) Int. Cl.
*H04J 3/16* (2006.01)
(52) U.S. Cl. ........................................................ 370/469
(58) Field of Classification Search .................. 370/469; 709/231, 217; 341/79, 51; 714/11
See application file for complete search history.

(56) References Cited

U.S. PATENT DOCUMENTS

| | | | |
|---|---|---|---|
| 5,621,884 A * | 4/1997 | Beshears et al. ................ 714/10 | |
| 6,327,418 B1 | 12/2001 | Barton | |
| 6,499,039 B1 | 12/2002 | Venkatesh et al. | |
| 6,625,750 B1 | 9/2003 | Duso et al. | |
| 6,792,195 B2 | 9/2004 | Barton | |
| 7,245,631 B2 * | 7/2007 | Sano et al. .................... 370/463 |
| 7,433,300 B1 * | 10/2008 | Bennett et al. ................ 370/216 |
| 7,437,598 B2 * | 10/2008 | Zohar et al. ......................... 714/6 |
| 7,555,257 B2 * | 6/2009 | Grossman et al. .......... 455/3.01 |
| 7,567,584 B2 * | 7/2009 | Toma et al. .................... 370/466 |
| 7,752,166 B2 * | 7/2010 | Quinlan et al. ............... 707/613 |
| 2005/0182800 A1 | 8/2005 | Ashwin et al. | |

OTHER PUBLICATIONS

Jaswinder Pal Singh, et al., "SPLASH: Standard Parallel Applications for Shared-Memory".
Tam M. Nguyen et al., "A Two-Tier Memory Architecture for High-Performance Multiprocessor Systems".
Magdalena Balazinska et al., "Load Management and High Availability in the Medusa Distributed Stream Processing System", SIGMOD 2004 Jun. 13-18, 2004, Paris, France.
Jim Gray, "Why Do Computers Stop and What Can Be Done About It," Technical Report 85.7, Jun. 1985, PN87614.
Hwang et al. "High Availability Algorithms for Distributed Stream Processing," In IEEE ICDE Conference (2005).
"The Theory and Practice of Reliable System Design" by Daniel P. Siewiorek and Robert. S. Swarz. Digital Press 1982. pp. 79-84, 140-175, 350-353, 507 and 590-594.

* cited by examiner

*Primary Examiner* — Ricky Ngo
*Assistant Examiner* — Chandrahas Patel
(74) *Attorney, Agent, or Firm* — Sughrue Mion, PLLC

(57) ABSTRACT

Embodiments of the present invention provide methods and systems for high availability in data-stream applications using separate but synchronized nodes. Initially, a live node is designated to provide the data stream. Upon startup or restart, a standby node synchronizes its state with the live node. The initial synchronization is performed in two phases. In the first phase, the standby node connects to the same data stream (or a data stream with same content) and obtains the same symbols as the live node. In the second phase, the standby node obtains metadata from the live node for various symbols, such as symbols that are new to the standby node. Once synchronized, the live and the standby nodes then continue with separately processing the data stream.

24 Claims, 3 Drawing Sheets

SYNCHRONIZING IN-MEMORY CACHES WHILE BEING UPDATED BY A HIGH RATE DATA STREAM

FIELD

The present invention relates to stream-based applications, and more particularly, a high availability feature for stream-based applications.

BACKGROUND

In a stream-based application, data is collected and pushed in real-time to the system in the form of a stream. Examples of stream-based applications include sensor monitoring applications, such as alarm systems and weather monitoring systems, financial applications, and the like. In stream-based applications, large amounts of information are collected, often from remote sites. These data streams are typically received as a real time data stream into a memory cache of a processing node or server.

A data stream can be viewed as consisting of a sequence of units called "ticks." Each unit tick carries some basic data describing itself and a timestamp identifying when the tick occurred. Each tick is associated with a symbol and there can be ticks for many symbols in a data stream. A symbol will have a name, and aggregate data is associated with the symbol. For example, aggregate data can indicate the number of ticks for that symbol, and the maximum, minimum and sum of data in the ticks for the symbol. The aggregated data for a symbol is also called metadata.

As an example, a stream-based application can be used for collecting stock trading information. Here, a tick may represent a trade of a number of shares of a stock at a particular price and at a particular time. The symbol is the stock that is named by its ticker symbol. Associated with the symbol is metadata, which contains the last price at which the stock traded, the maximum and minimum price at which it traded, the sum of the number of shares traded and the number of trades, which is also the total number of ticks received for that symbol. Given the nature of stock trading, the data stream is transmitted at a high rate and contains a large amount of information.

However, the failure of a single node or server can significantly disrupt a stream-based application, such as a stock trading application. For example, in the event of a failure, the data in memory is volatile and a system crash could cause all of the data in that node to be lost. Therefore, many stream-based applications may provide a high-availability feature that allows the stream processing to continue even in the event of a single node failure.

Unfortunately, the known techniques for implementing high availability are ill suited for stream-based applications. As noted, many stream-based applications must handle high data rates and support large amounts of information that must be updated in real-time. Many of the-known techniques are unable to continue receiving and processing data-streams while recovering from a failure. In addition, many of the known techniques rely on transaction based updates, which are too slow for the pace of tick based updates found in data-stream applications.

Accordingly, it may be desirable to provide methods and systems for a high availability configuration able to continue receiving and processing data streams even in the event of a failure. In addition, it may be desirable to provide methods and systems that can perform this backup or failsafe function in a manner that is easily implemented into existing systems.

SUMMARY

An exemplary embodiment provides a method of synchronizing a state of a standby node with a live node, wherein the live node is configured to process a data stream including a sequence of ticks, and wherein the standby node is configured to continue with processing of the sequence of ticks when the live node has failed. The method including reading, simultaneously by the live node and the standby node, ticks in the data stream, storing temporarily, by the standby node, the ticks for a part of the data stream that is being initially synchronized with the live node in a tick save buffer, identifying, by said standby node, symbols in the ticks of the data stream after the ticks have been initially synchronized, determining if the identified symbols are new symbols, requesting, from the live node, metadata for each of the new symbols and synchronizing the state of the standby node with the live node based on the requested metadata and based on updates provided in the data stream. During the synchronizing the state of the standby node with the live node, the standby node creates a list of symbol names that are not synchronized and sends them to the live node, and the live node sends the ticks that correspond to the created list of symbol names which are subsequently saved in the standby node.

The synchronizing the state of the standby node may include delaying processing of updates provided in the data stream in the standby node relative to the live node.

The reading ticks in the data stream may include reading an ordered unique identifier in each of the ticks.

The identifying symbols in the ticks of the data stream may include identifying a name assigned to the symbol.

The determining if the identified symbols are new symbols may include searching a symbol store based on the symbol's name.

The identifying symbols in the ticks of the data stream may include identifying a flag in the symbol.

The synchronizing the state of the standby node with the live node may include updating metadata for the symbol based on the flag.

The identified flag may indicate that metadata has been synchronized in the standby node for that symbol, that metadata has been requested by the standby node for that symbol or that ticks for that symbol have been lost while requesting metadata from the live node.

The requesting, from the live node, metadata for each of the new symbols may include requesting the metadata in a plurality of batches.

The synchronizing the state of the standby node with the live node may not require a use of a checkpoint.

The synchronizing the state of the standby node with the live node may include synchronizing the state of a single standby node with a single live node.

According to an aspect of another exemplary embodiment, there is provided an apparatus comprising means configured to perform the method of synchronizing a state of a standby node with a live node, wherein the live node is configured to process a data stream including a sequence of ticks, and wherein the standby node is configured to continue with processing of the sequence of ticks when the live node has failed. The method including reading, simultaneously by the live node and the standby node, ticks in the data stream, storing temporarily, by the standby node, the ticks for a part of the data stream that is being initially synchronized with the live node in a tick save buffer, identifying, by said standby node, symbols in the ticks of the data stream after the ticks have been initially synchronized, determining if the identified symbols are new symbols, requesting, from the live node, metadata for each of the new symbols and synchronizing the state of the standby node with the live node based on the requested metadata and based on updates provided in the data stream. During the synchronizing the state of the standby node with the live node, the standby node creates a list of symbol names that are not synchronized and sends them to the live node, and the live node sends the ticks that correspond to the created list of symbol names which are subsequently saved in the standby node.

According to an aspect of another exemplary embodiment, there is provided a computer readable medium comprising executable instructions for performing the method of synchronizing a state of a standby node with a live node, wherein the live node is configured to process a data stream including a sequence of ticks, and wherein the standby node is configured to continue with processing of the sequence of ticks when the live node has failed. The method including reading, simultaneously by the live node and the standby node, ticks in the data stream, storing temporarily, by the standby node, the ticks for a part of the data stream that is being initially synchronized with the live node in a tick save buffer, identifying, by said standby node, symbols in the ticks of the data stream after the ticks have been initially synchronized, determining if the identified symbols are new symbols, requesting, from the live node, metadata for each of the new symbols and synchronizing the state of the standby node with the live node based on the requested metadata and based on updates provided in the data stream. During the synchronizing the state of the standby node with the live node, the standby node creates a list of symbol names that are not synchronized and sends them to the live node, and the live node sends the ticks that correspond to the created list of symbol names which are subsequently saved in the standby node.

According to an aspect of another exemplary embodiment, there is provided a high availability system configured to provide a data stream, the system including a live node configured to receive and provide the data stream, wherein the data stream includes a sequence of ticks, a standby node configured to read ticks in the data stream simultaneously along with the live node, storing temporarily the ticks for a part of the data stream that is being initially synchronized with the live node in a tick save buffer, identify symbols in the ticks of the data stream after the ticks have been initially synchronized, determine if the identified symbols are new symbols, request, from the live node, metadata for each of the new symbols, and synchronize with the live node based on the requested metadata and based on updates provided in the data stream and a processor configured to monitor the live node and the standby node and direct the standby node to continue with providing the data stream when the live node fails, wherein during the synchronization of the standby node with the live node, the standby node creates a list of symbol names that are not synchronized and sends them to the live node, and wherein the live node sends the ticks that correspond to the created list of symbol names which are subsequently saved in the standby node.

The standby node may include a symbol store that indicates symbols previously synchronized with the live node.

The standby node may be configured to request, from the live node, metadata for each of the new symbols, and synchronize with the live node based on the requested metadata when starting up.

The ticks in the data stream may include an ordered unique identifier.

The ticks in the data stream may include a symbol having a name and metadata.

The ticks in the data stream may include a symbol having a flag that indicates a status of synchronizing that symbol between the live node and the standby node.

The live node may be configured to start up as a standby node, after a failure.

The standby node may be configured to process ticks stored in the tick save buffer after they have been synchronized.

According to an aspect of another exemplary embodiment, there is provided a method of synchronizing a state of a standby node with a live node, wherein the live node is configured to process a data stream comprising a sequence of ticks, and wherein the standby node is configured to continue with processing of the sequence of ticks when the live node has failed, the method including reading, simultaneously by said live node and said standby node, ticks in the data stream, storing temporarily, by the standby node, the ticks for a part of the data stream that is being initially synchronized with the live node in a tick save buffer, identifying, by said standby node, symbols in the ticks of the data stream after the ticks have been initially synchronized, adding said new symbols to a first symbol store and a second symbol store, said first symbol store and said second symbol store corresponding to said live node and said standby node, respectively, requesting and receiving, from the live node, names of symbols stored in the first symbol store, determining if the received names of symbols are names of new symbols, storing, in said second symbol store, the names of new symbols received from said live node, requesting, from the live node, metadata for each of the names of new symbols and synchronizing the state of the standby node with the live node based on the requested metadata and based on updates provided in the data stream, wherein during the synchronizing the state of the standby node with the live node, the standby node creates a list of symbol names that are not synchronized and sends them to the live node, and wherein the live node sends the ticks that correspond to the created list of symbol names which are subsequently saved in the standby node.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

As noted, embodiments of the present invention provide methods and systems for high availability in data-stream applications using separate but synchronized nodes. The standby and live nodes both process the stream during synchronization and after synchronization. Initially, a live node is designated to provide the data stream. Upon startup or restart, a standby node synchronizes its state with the live node. The initial synchronization is performed in two phases. In the first phase, the standby node connects to the same data stream (or a data stream with same content) and obtains the same symbols as the live node. The data stream is processed during synchronization and new symbols may be accepted from the stream. However, the standby node is configured to obtain a full set of symbols from the live node. In the second phase, the standby node obtains metadata from the live node for various symbols, such as symbols that are new to the standby node.

Once synchronized, the live and the standby nodes then continue with separately processing the data stream. For example, during streaming operations, the live and standby nodes may maintain a last value cache with on-the-fly aggregations of the data. Thus, although they are operating separately, the standby node still has the same information in its last value cache as the live node. Since the standby node initially synchronizes with the live node, the standby node does not need to coordinate its operations with the live node, e.g., by using checkpoints and the like.

In some embodiments, the standby node is optionally configured to delay its processing of the data stream to provide a skew. One skilled in the art will recognize that a delay is not essential, because the standby node may comprise a tick save buffer allows synchronization without the use of delay. In some embodiments, a delay can be optionally introduced to increase the likelihood of successfully synching metadata for a symbol on the first attempt. However, if a delay is not used the standby node can continually retry until successful if necessary.

Reference will now be made in detail to exemplary embodiments of the invention, which are illustrated in the accompanying drawings. Wherever possible, the same reference numbers will be used throughout the drawings to refer to the same or like parts. The present disclosure now begins with reference to FIG. 1.

Figure 1:
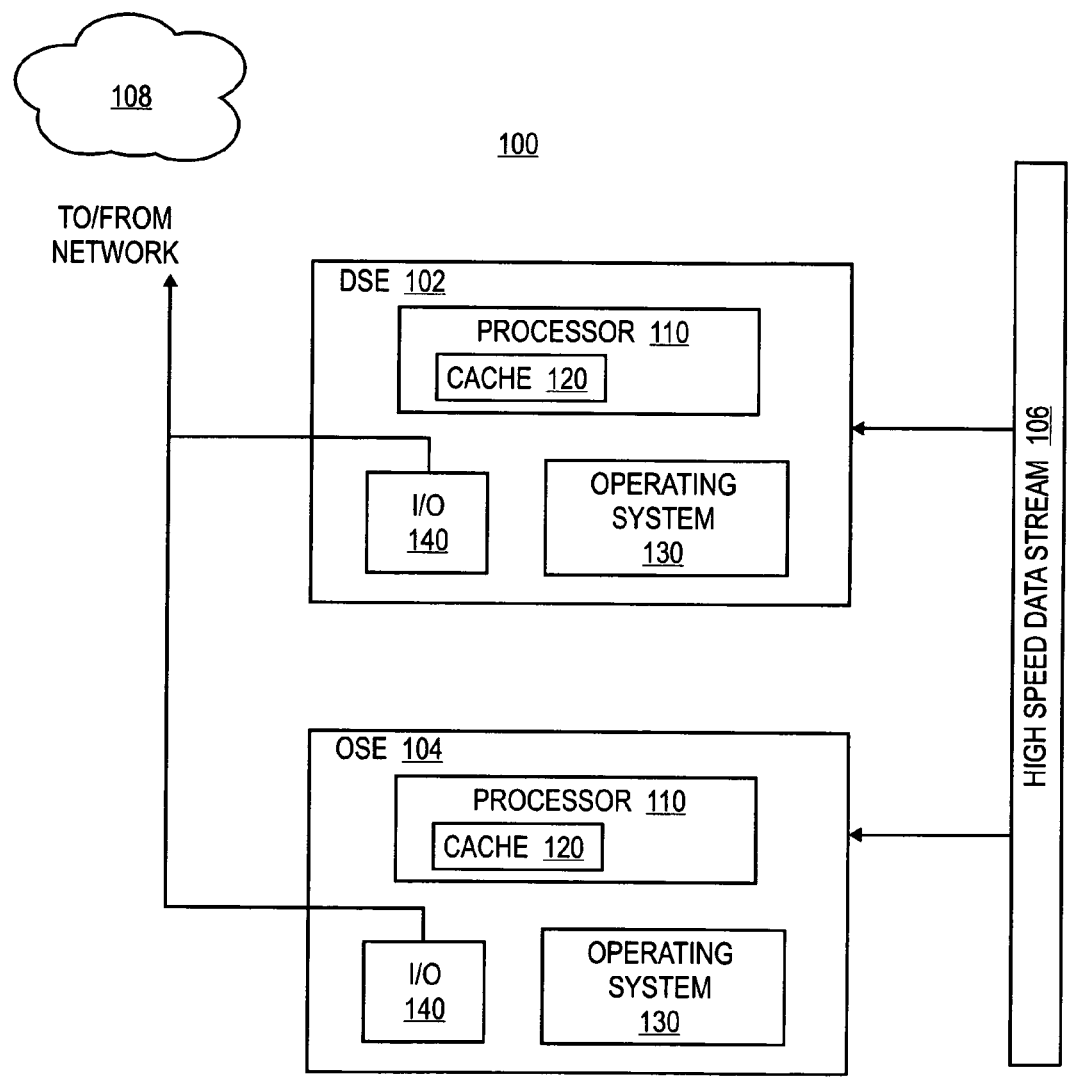
FIG. 1 shows a system that is consistent with the principles of the present invention.

FIG. 1 shows a system 100 that is consistent with the principles of the present invention. For purposes of illustration, system 100 illustrates an exemplary architecture of a cluster of data stream engine (DSE) systems for synchronizing separate in-memory caches while being updated by a common high rate data stream. For example, the DB2 Universal Database system from IBM Corporation of Armonk N.Y. can provide streaming applications using a feature in the DB2 Data Stream Engine (DSE) product. Thus, for example, system 100 may comprise a cluster of nodes or hosts each running a DSE instance.

For purposes of illustration, system 100 is shown comprising two nodes that each runs a DSE instance. Accordingly, the system 100 is shown including at least two DSE nodes 102 and 104. One skilled in the art will recognize that system 100 may comprise any number of nodes. As shown, systems 102 and 104 may process a high speed data stream 106 and may be coupled together via network 108.

High speed data stream 106 may refer to any data stream. As noted, data stream 106 may be data collected from a plurality of remote devices, such as sensors or client machines that push data to system 100. For purposes of explanation, high speed data stream 106 is configured as a sequence of units or ticks that are processed by DSE nodes 102 and 104. As noted, each tick may further comprise symbols and associated metadata.

In some embodiments, DSE nodes 102 and 104 maintain a store of symbols used in data stream 106. A symbol has a name, a set of flags to manage synchronization and a metadata record. In addition, DSE nodes 102 and 104 may use three flags. First, a "synchronized" flag may show that the metadata is synchronized for that symbol. Second, a "fetching" flag may show that metadata is being fetched for the symbol. And third, a "Ticks_lost" flag may show that ticks for the symbol have been lost while fetching metadata. Associating flags with each symbol allows symbols to be synchronized independently.

A store of ticks is also associated with each symbol in DSE nodes 102 and 104. Synchronization may rely on each tick having an ordered unique identifier. The order may make it possible to identify that one tick for a symbol came before another. The identifier may be a composite of more than one value. For example, if only one tick may come from a symbol in a time period, the timestamp along with the symbol name can be used as the identifier. A sequence number on each tick in the data stream 106 can also be used as the identifier. If there is a sequence number associated with each symbol, a composite of the symbol sequence number and the symbol name can be used as the identifier.

For synchronization purposes, the live and standby DSE nodes 102 and 104 may use the same identifier for each symbol. The identifier is stored in the metadata. When a tick arrives for a symbol that is not synchronized the unique identifier is updated in the metadata, otherwise the metadata is not updated.

Network 108 may comprise a local area network, or wide area network, or a combination of networks. In addition, network 108 may support communications using known protocols, such as the transport control protocol and internet protocol ("TCP/IP") and hypertext transport protocol ("HTTP"). Typically, DSE nodes 102 and 104 may be in close proximity to each other to ensure simultaneous receipt of high speed data stream 106. However, the proximity of DSE nodes 102 and 104 is not essential to functioning of embodiments of the present invention.

The components of system 100 may be implemented on separate devices or may be implemented on one or more of the same devices or systems. For example, DSE nodes 102 and 104 can refer to any device or plurality of devices. DSE nodes 102 and 104 can each simply be a personal computer, workstation, or terminal. Alternatively, DSE nodes 102 and 104 can each be a server, a database server, an application server, and the like. Such devices and systems are well known to those skilled in the art.

As also shown in FIG. 1, each DSE node can include a processor 110 which in turn may include the cache 120. The cache 120 may be an "on-chip" or internal cache, or may be implemented in a physical memory (not shown) that is coupled to processor 110. DSE nodes 102 and 104 may also be provided with additional peripheral devices, such as a keyboard, mouse, or printer (not shown).

An operating system 130 may be installed in DSE nodes 102 and 104 and is an integrated collection of routines that service the sequencing and processing of programs and applications executed by nodes 102 and 104. The operating system 130 may provide many services for the DSE nodes 102 and 104, such as resource allocation, scheduling, input/output control, and data management. The operating system 130 may be predominantly software, but may also comprise partial or complete hardware implementations and firmware. Well-known examples of operating systems that are consistent with the principles of the present invention include the z/OS operating system, LINUX, and UNIX.

Input/output controller 140 couples the DSE nodes 102 and 104 to other devices and network 108. For example, input/output controller 140 may comprise well known hardware, firmware, and software for network communications, such as an Ethernet interface, a universal serial bus interface, and the like. Other devices and software for input/output controller are well known to those skilled in the art.

In addition, DSE nodes 102 and 104 may also include a tick save buffer (not shown). The tick save buffer provides a temporary location for parts of data stream 106 that need to be synchronized. In particular, the tick save buffer provides a temporary location for ticks relating to symbols that are being synchronized. In some embodiments, a standby DSE node may optionally delay the data stream for ticks that refer to symbols that are being synchronized by storing those ticks in the tick save buffer. These ticks may then be processed after the metadata for the symbols has been received from a live DSE node. However, one skilled in the art will also recognize that a tick save buffer also allows synchronization without the use of delay. In some embodiments, a delay is optionally introduced to increase the likelihood of successfully synching metadata for a symbol on the first attempt. If a delay is not used, a standby DSE node may simply make multiple attempts at synchronization.

It is intended that the method and system may be an application running on a UNIX-based operating system, or a database application. However, one skilled in the art will recognize that the principles of the present application may be applied to any stream-based application.

In addition, system 100 may comprise a monitoring system or processor (not shown), such as the Tivoli System by the IBM Corporation. The monitoring system may monitor the status of DSE nodes 102 and 104 and determine if a failure event has occurred. The monitoring system may then provide one or more alerts and then direct DSE nodes 102 and 104 to transition from standby to live status and vice versa. Such monitoring systems are well known to those skilled in the art. One skilled in the art will recognize that embodiments of the present invention may be implemented with any form of monitoring system.

Figure 2:
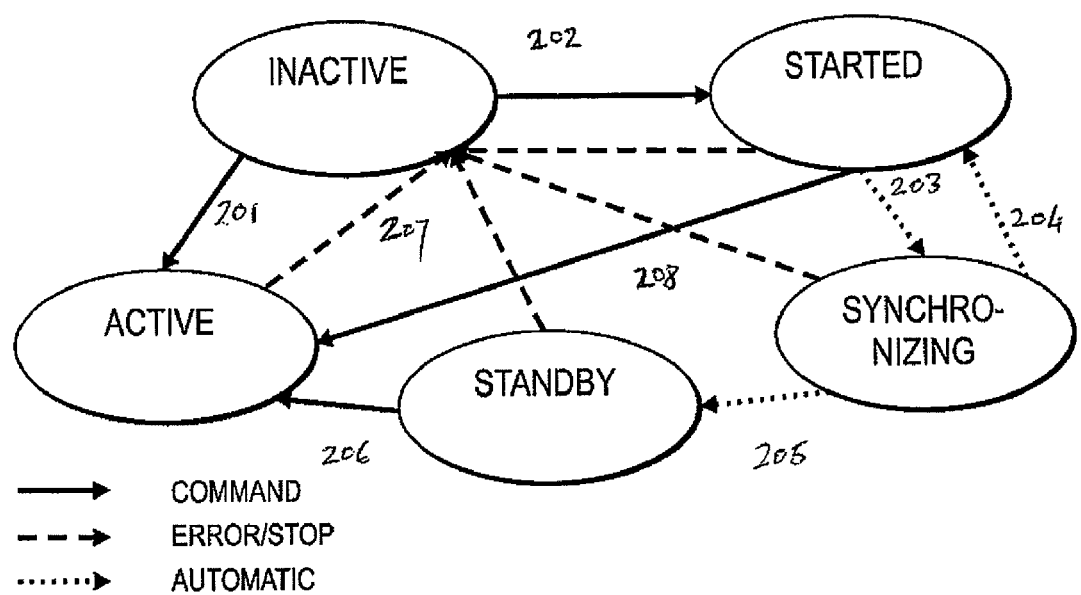
FIG. 2 shows a diagram of exemplary systems and transition states for the hardware components shown in FIG. 1.

FIG. 2 shows general DSE states and transitions between these states that may be implemented in DSE nodes 102 and 104. In particular, DSE nodes 102 and 104 may have any number of operational states including ACTIVE, STANDBY, SYNCHRONIZING, STARTED, and INACTIVE. Each operational state can change to another of the operational states as shown in FIG. 2.

In the ACTIVE state, a DSE node is considered "live" and currently implementing the DSE functionality. In some embodiments, system 100 comprises only one live node in a cluster of DSE nodes. In the STANDBY state, a DSE node is a standby DSE node, synchronized with the live DSE node, and ready to take over its role if the live DSE node fails. In the SYCHRONIZING state, the standby DSE node is in the process of synchronizing its state with the live DSE node. In the STARTED state, the DSE node has been started in standby mode and it is in the process of finding the live DSE node so that it can synchronize its state. In the INACTIVE state, the particular DSE is not available.

FIG. 2 illustrates a relationship between the DSE states and transitions. A DSE node, such as DSE nodes 102 or 104 can be started in live or standby mode. When started in live mode, that DSE node goes immediately to ACTIVE state 201. When started in standby mode, that DSE node goes to STARTED state 202.

When starting or restarting, the standby DSE node synchronizes its state with the live DSE node. In the STARTED state, the standby DSE node connects to the live DSE node. In particular, after making a connection to the live DSE node, the standby DSE node automatically goes to the SYNCHRONISING state 203. While synchronizing, the standby DSE node may lose its connection with the live DSE node in which case the standby DSE node goes back to STARTED state 204. When synchronization is complete, that DSE node then automatically becomes operational as a standby node and goes into the STANDBY state 205. When in STANDBY state, that DSE node can be put into the ACTIVE state 206 by a command from an external agent, such as monitoring processor or system.

At any time a DSE node may fail or be stopped, in which case it goes to the INACTIVE state 207. A DSE node in the STARTED state can be put in the ACTIVE state by a command 208. This transition state is provided for cold startup and for use in emergencies.

Essentially, when a failure occurs, a standby DSE node is given the command to transition from STANDBY to ACTIVE state and that DSE node ensures that it completes any interactions with the database that the failed DSE node had been in the process of completing.

An external view of states and transitions was described with reference to FIG. 2. Internal to the DSE nodes 102 and 104, a state management module may be running on processor 110 and maintains state and manages the transitions. This module implements the external functions as well as an internal version of the functions.

In some embodiments, a handler thread in the standby DSE node 104 manages the "Synchronize" transition from the "STARTED" state to the "STANDBY" state. On startup, the state is initially set to STARTED. The standby handler thread then connects to the live DSE node 102 and, when successful, sets the state to SYNCHRONIZING. The handler thread then synchronizes the symbol names, metadata and history in the methods described with reference to FIG. 3. When synchronizing is complete the handler thread sets the state to STANDBY.

If communication with the live DSE node 102 is lost, the handler thread is killed, the state of the DSE node goes to STARTED and a new handler thread is started. However, in some embodiments, the synchronized state of stores and symbols is not changed.

In some embodiments, the new handler thread does not redo work that has already been done, thus if the symbol names have been synchronized for a store, the new thread does not resynchronize the names for that store. Thus, a new handler thread will quickly proceed through the synchronization steps that have already been done and continue with synchronization where the previous thread left off.

Publishing may be disabled until the DSE node is fully synchronized because while partially synchronized, the DSE node would only be able to publish symbols whose metadata were synchronized, and thus, it would publish a moving subset of the symbols that it is expected to publish.

Figure 3:
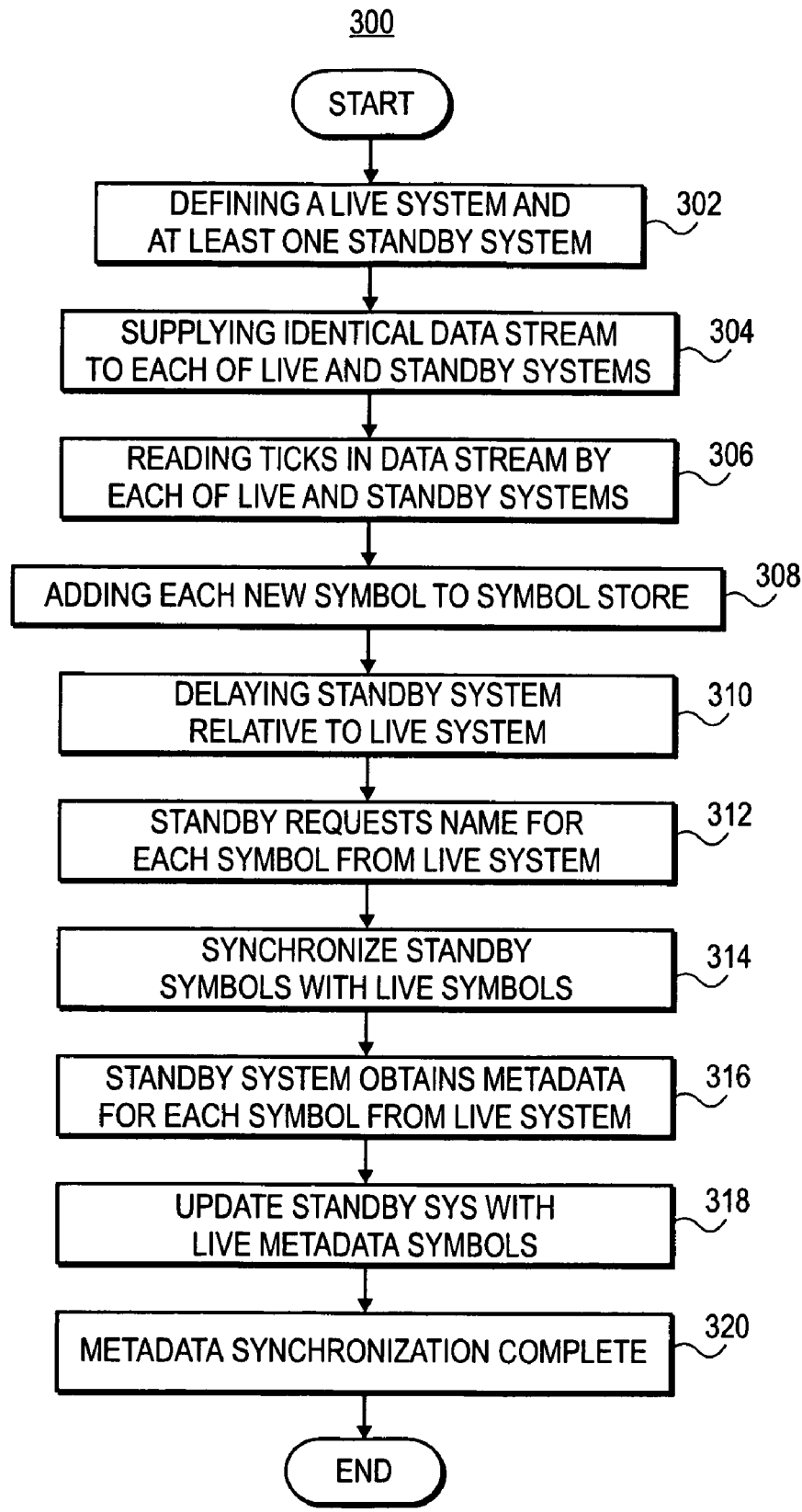
FIG. 3 shows an exemplary process flow for synchronizing in-memory caches of live and standby nodes while data is updated by the high rate data stream in accordance with the principles of the present invention.

Now that some exemplary systems have been described, the present disclosure will now describe various processes and methods that are consistent with the principles of the present invention. The flow diagram depicted herein is provided by way of example. There may be variations to these diagrams or the steps (or operations) described herein without departing from the spirit of the invention. For instance, in certain cases; the steps may be performed in differing order, or steps may be added, deleted or modified. All of these variations are considered to comprise part of the present invention as recited in the appended claims. Reference will now be made to FIG. 3.

In general, FIG. 3 illustrates an exemplary process flow 300 for synchronizing in-memory caches in DSE nodes 102 and 104. For purposes of illustration, it is initially assumed that DSE node 102 is the live DSE node and that DSE node 104 is the standby DSE node. As noted, DSE nodes 102 and 104 may comprise an in-memory cache 120 that receives a real time data stream, such as data stream 106. Both DSE nodes 102 and 104 may process the data stream 106 during synchronization.

Initially when the standby node, i.e., DSE node 104, is starting up or restarting, the synchronization is performed in two broad phases. In a first phase of processing, received symbols in data stream 106 are synchronized between the standby DSE node and the live DSE node. Should any new symbol to the standby node appear in the data stream, that symbol is added to the symbol store of the standby DSE node 104. In particular, when a new symbol is detected, the standby DSE node 104 sends a series of messages to the live DSE node 102 requesting the names of all the symbols in the live DSE node's symbol store. In some embodiments, if the store of either the live or standby DSE node does not accept new symbols, it is marked as having its symbol names synchronized. In the second phase of processing, the metadata in the standby DSE node 104 is then updated with the metadata in the live DSE node. The standby DSE node 104 may then separately process the data stream 106 and be in the same state as the live DSE node 102. An exemplary process flow for performing the initial synchronization of the standby DSE node 104 will now be described with reference to FIG. 3.

As shown, in stage 302, a live DSE node and a standby DSE node are defined in system 100. For example, DSE node 102 may be defined as the live DSE node, while DSE node 104 may be defined as the standby DSE node. This definition may be performed by a system administrator using, for example, a monitoring system, such as the Tivoli Software from the IBM Corporation.

The definition of the live and standby nodes may be based on various criteria. For example, the first DSE node to startup may be automatically defined as the live DSE node. Alternatively, a live DSE node may be defined based on a configuration setting or selection by a system administrator or user of system 100. A DSE node may also be defined as the live or standby node based on its location, processing capabilities, etc. Any criteria may be used in embodiments of the present invention. For purposes of illustration, it is assumed that DSE node 102 is initially defined as the live DSE node and DSE node 104 is the defined as the standby DSE node. Processing may then flow to stage 304.

In stage 304, the live DSE node 102 and standby DSE node 104 are supplied an identical data stream, such as data stream 106, or data streams having the same content. In stage 306, DSE nodes 102 and 104 read the ticks in the data stream 106 and determine the symbols used in these ticks.

In stage 308, DSE nodes 102 and 104 checks for any new symbols that have appeared in the ticks of data stream 106. For each new symbol, DSE nodes 102 and 104 add the new symbol to a symbol store. The symbol store may be located in cache 120, a memory, or a storage device coupled to DSE nodes 102 and 104.

In stage 310, the standby DSE node 104 may optionally delay for a short period of time to allow for skew between the times that it receives ticks from the data stream 106 and the time that the live DSE node 102 receives ticks from the data stream 106. The standby DSE node 104 then sends a series of messages requesting the names of all the symbols in the store of live DSE node 102. One skilled in the art will recognize that a delay by the standby DSE node 104 is not essential, because the standby DSE node 104 may comprise a tick save buffer that allows synchronization of symbol metadata without the delay. The delay can be introduced to increase the likelihood of successfully synching metadata for a symbol on the first attempt. However, even if a delay is not used, the standby DSE node 104 can continually retry until successful if necessary.

If the standby DSE node 104 receives the name of a new (or unknown) symbol, it is added to the symbol store; however its metadata is marked as not synchronized. When the standby DSE node 104 has received all the names in the live DSE node store, it will have the same set of symbols as the live DSE node 102. In some embodiments, the request for names is broken down into a number of messages to reduce the burden on the live DSE node 102 whose primary duty is to receive and process data stream 106.

In stage 312, the standby DSE node 104 requests a name for each symbol from the live DSE node 102. In particular, the standby DSE node 104 may send a sequence of requests to get all the symbol names in the live DSE node 102 store.

In some embodiments, because the request can be large, the response by the live DSE node 102 may be broken down into batches, each of which is requested separately by the standby DSE node 104. If any new symbols are found by the standby DSE node 104 in the response, they are added to the symbol store of the standby DSE node 104. If a new symbol arrives in data stream 106 while the symbols are being requested, the new symbol is also added however its metadata is marked as not synchronized.

On starting metadata synchronization, the standby DSE node 104 starts calling the update metadata procedure in a feed handler process running on processor 110. The DSE node 104 may also allocate a buffer in the feed handler to save messages and ticks while metadata is being fetched.

For example, the standby DSE node 104 may read a flag that indicates whether the symbol is synchronized or not. If a new symbol arrives, it is added and its metadata is marked as synchronized. Initially, the standby DSE node 104 may wait for a delay period to allow for skew between the standby DSE node 104 and the live DSE node 102 before requesting metadata.

The standby DSE node 104 then creates a list of symbol names that are not synchronized and sends them to the live DSE node 102 in one or more messages. While metadata for a symbol is being requested, the standby DSE node 104 may set a flag to indicate that a symbol's metadata is being fetched. When this flag is set and a message arrives, the tick and message are saved by the standby DSE node 104 in a buffer bucket associated with the feed. A pointer to the header is also saved with each message.

In order to ensure proper sequencing, the live DSE node 102 may set a sequence flag in the first message of the sequence. In subsequent messages from the standby DSE node 104, the flag may indicate the last symbol name sent in the previous from the live DSE node 102.

In responding, the live DSE node 102 sends each symbol name once, using the last symbol name to know where to start getting names for each message. When the live DSE node 102 has sent all the names in its store, the last message is marked with a flag and name synchronization is complete.

In addition, additional flags may be used indicate whether all the symbol names in the store are synchronized. New symbols may be inserted into each symbol store of DSE nodes 102 and 104 in a different order without impacting their operations.

In stage 314, the standby DSE node 104 receives the information from the live DSE node 102 and synchronizes the symbols in its symbol store. In some embodiments, the standby DSE node 104 may arrange symbols in the same arrangement as the live DSE node 102.

While synchronizing their symbol stores, in the live DSE node 102, a new symbol is marked as synchronized. However, in the standby DSE node 104 the symbol is marked as not synchronized until the first phase of synchronization is complete. After the first phase, the standby DSE node 104 marks the symbol as synchronized when it adds a new symbol to its store. There is no need to synchronize the metadata for that symbol because the standby DSE node 104 has seen the same ticks for the symbol as the live DSE node 102 and their metadata is synchronized.

The processing may then continue into its second phase. In general, in the second phase, the standby DSE node 104 obtains and synchronizes the metadata for each symbol. The standby DSE node 104 sends a message to the live DSE node 102 requesting metadata for a number of symbols, such as the symbols that are new to the standby DSE node 104. On receiving the response, the standby DSE node 104 updates the metadata for the symbols.

When the metadata message is received from the live DSE node 102, the metadata for each symbol is loaded. If successfully loaded, the standby DSE node 104 may set a flag and then use the saved messages to update the metadata. The standby DSE node 104 may then repeat this process to fetch any next batches of metadata.

A sequence number in the tick message stream 106 is used to ensure that ticks are not applied to metadata twice and that no ticks are missed. One skilled in the art will recognize that correct metadata is the result of each tick being used to update the metadata exactly once.

In stage 316, the standby DSE node 104 obtains metadata for each symbol from the live DSE node 102. As the metadata for all the symbols in a store can be large, metadata is requested in batches. The standby DSE node 104 may create a list of symbols that are not synchronized and send that list to the live DSE node 102 asking for the metadata for only those symbols. While the metadata is being fetched, the fetching flag is set in the symbol. If a tick arrives for a symbol while the fetching flag is set, the tick is saved in a tick save buffer in standby DSE node 104. If there is not enough space in the tick save buffer to save the tick, a tick lost flag may be set in the symbol.

Meanwhile, the live DSE node 102 receives the messages requesting metadata for a set of symbols. It then creates a reply message containing the metadata for those symbols.

The standby DSE node 104 receives the reply message and processes it. If the tick lost flag is set, the metadata for the symbol is discarded and the symbol is not marked as synchronized. If the symbol has never received a tick, the metadata from the message is applied and the symbol is marked as synchronized by the standby DSE node 104. Next the metadata from the message is compared with the metadata in the store. If the ordered unique identifier in the metadata in the store is in advance of the identifier in the metadata from the message, the metadata from the message is discarded and the symbol is not marked as synchronized, because the standby DSE node 104 has processed the data stream in advance of the live DSE node 102. Otherwise the metadata for the symbol is saved in the symbol store and the symbol is marked as synchronized. In all cases the fetching flag and the ticks lost flags for the symbol are cleared.

After a symbol has been synchronized and before any newly arrived ticks can be processed against it, if there are ticks for the symbol in the tick save buffer, the ticks are applied to the symbol and used to update its metadata. Any tick with a unique ordered identifier that is less or equal to the identifier in the metadata is discarded. Otherwise the tick is used to update the metadata.

In stage 318, the standby DSE node 104 receives the metadata and updates metadata for each symbol in its symbol store to correspond to the symbol store in the live DSE node 102. In stage 320, the standby DSE node 104 repeats this updating until all symbols between the standby DSE node and the live DSE node match. In particular, the standby DSE node 104 continues to search its store for symbols that have not been synchronized and request the metadata for those symbols. Metadata synchronization is complete when all the symbols in the store have been synchronized.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of synchronizing a state of a standby node with a live node, wherein the live node is configured to process a data stream comprising a sequence of ticks, and wherein the standby node is configured to continue with processing of the sequence of ticks when the live node has failed, said method comprising:
reading, simultaneously by the live node and the standby node, ticks in the data stream;
storing temporarily, by the standby node, the ticks for a part of the data stream that is being initially synchronized with the live node in a tick save buffer;
identifying, by said standby node, symbols in the ticks of the data stream after the ticks have been initially synchronized;
determining if the identified symbols are new symbols
requesting, from the live node, metadata for each of the new symbols; and
synchronizing the state of the standby node with the live node based on the requested metadata and based on updates provided in the data stream,
wherein during the synchronizing the state of the standby node with the live node, the standby node creates a list of symbol names that are not synchronized and sends them to the live node, and
wherein the live node sends the ticks that correspond to the created list of symbol names which are subsequently saved in the standby node.

2. The method of claim 1, synchronizing the state of the standby node comprises delaying processing of updates provided in the data stream in the standby node relative to the live node.

3. The method of claim 1, reading ticks in the data stream comprises reading an ordered unique identifier in each of the ticks.

4. The method of claim 1, wherein identifying symbols in the ticks of the data stream comprises identifying a name assigned to the symbol.

5. The method of claim 4, wherein determining if the identified symbols are new symbols comprises searching a symbol store based on the symbol's name.

6. The method of claim 1, wherein identifying symbols in the ticks of the data stream comprises identifying a flag in the symbol.

7. The method of claim 6, wherein synchronizing the state of the standby node with the live node comprises updating metadata for the symbol based on the flag.

8. The method of claim 6, wherein the identified flag indicates that metadata has been synchronized in the standby node for that symbol.

9. The method of claim 6, wherein the identified flag indicates that metadata has been requested by the standby node for that symbol.

10. The method of claim 6, wherein the identified flag indicates that ticks for that symbol have been lost while requesting metadata from the live node.

11. The method of claim 1, wherein requesting, from the live node, metadata for each of the new symbols comprises requesting the metadata in a plurality of batches.

12. An apparatus comprising means configured to perform the method of claim 1.

13. A computer readable medium comprising executable instructions for performing the method of claim 1.

14. The method of claim 1, wherein the synchronizing the state of the standby node with the live node does not require a use of a checkpoint.

15. The method of claim 1, wherein the synchronizing the state of the standby node with the live node comprises synchronizing the state of a single standby node with a single live node.

16. A high availability system configured to provide a data stream, said system comprising:
- a live node configured to receive and provide the data stream, wherein the data stream comprises a sequence of ticks;
- a standby node configured to read ticks in the data stream simultaneously along with the live node, storing temporarily the ticks for a part of the data stream that is being initially synchronized with the live node in a tick save buffer, identify symbols in the ticks of the data stream after the ticks have been initially synchronized, determine if the identified symbols are new symbols, request, from the live node, metadata for each of the new symbols, and synchronize with the live node based on the requested metadata and based on updates provided in the data stream; and
- a processor configured to monitor the live node and the standby node and direct the standby node to continue with providing the data stream when the live node fails,
wherein during the synchronization of the standby node with the live node, the standby node creates a list of symbol names that are not synchronized and sends them to the live node, and
wherein the live node sends the ticks that correspond to the created list of symbol names which are subsequently saved in the standby node.

17. The system of claim 16, wherein the ticks in the data stream comprise an ordered unique identifier.

18. The system of claim 16, wherein the ticks in the data stream comprise a symbol having a name and metadata.

19. The system of claim 16, wherein the ticks in the data stream comprise a symbol having a flag that indicates a status of synchronizing that symbol between the live node and the standby node.

20. The system of claim 16, wherein, after a failure, the live node is configured to start up as a standby node.

21. The system of claim 16, wherein, the standby node is configured to process ticks stored in the tick save buffer after they have been synchronized.

22. The system of claim 16, wherein the standby node comprises a symbol store that indicates symbols previously synchronized with the live node.

23. The system of claim 16, wherein the standby node is configured request, from the live node, metadata for each of the new symbols, and synchronize with the live node based on the requested metadata when starting up.

24. A method of synchronizing a state of a standby node with a live node, wherein the live node is configured to process a data stream comprising a sequence of ticks, and wherein the standby node is configured to continue with processing of the sequence of ticks when the live node has failed, said method comprising:
- reading, simultaneously by said live node and said standby node, ticks in the data stream;
- storing temporarily, by the standby node, the ticks for a part of the data stream that is being initially synchronized with the live node in a tick save buffer;
- identifying, by said standby node, symbols in the ticks of the data stream after the ticks have been initially synchronized;
- adding said new symbols to a first symbol store and a second symbol store, said first symbol store and said second symbol store corresponding to said live node and said standby node, respectively;
- requesting and receiving, from the live node, names of symbols stored in the first symbol store;
- determining if the received names of symbols are names of new symbols;
- storing, in said second symbol store, the names of new symbols received from said live node;
- requesting, from the live node, metadata for each of the names of new symbols; and
- synchronizing the state of the standby node with the live node based on the requested metadata and based on updates provided in the data stream,
wherein during the synchronizing the state of the standby node with the live node, the standby node creates a list of symbol names that are not synchronized and sends them to the live node, and
wherein the live node sends the ticks that correspond to the created list of symbol names which are subsequently saved in the standby node.

* * * * *